(12) United States Patent
Bevan et al.

(10) Patent No.: US 7,372,832 B2
(45) Date of Patent: May 13, 2008

(54) CHANNEL SELECTION

(75) Inventors: David Bevan, Bishops Stortford (GB); Steven Baines, Bishops Stortford (GB); Martin Smith, Chelmsford (GB)

(73) Assignee: Nortel Networks Limited, St. Laurent, Quebec (CA)

( * ) Notice: Subject to any disclaimer, the term of this patent is extended or adjusted under 35 U.S.C. 154(b) by 890 days.

(21) Appl. No.: 10/683,413

(22) Filed: Oct. 10, 2003

(65) Prior Publication Data

US 2004/0156353 A1 Aug. 12, 2004

Related U.S. Application Data

(60) Provisional application No. 60/480,599, filed on Jun. 20, 2003, provisional application No. 60/468,456, filed on May 7, 2003, provisional application No. 60/467,432, filed on May 2, 2003, provisional application No. 60/464,844, filed on Apr. 23, 2003, provisional application No. 60/461,579, filed on Apr. 9, 2003, provisional application No. 60/461,344, filed on Apr. 9, 2003, provisional application No. 60/454,715, filed on Mar. 15, 2003, provisional application No. 60/453,840, filed on Mar. 11, 2003, provisional application No. 60/453,011, filed on Mar. 7, 2003, provisional application No. 60/451,897, filed on Mar. 4, 2003, provisional application No. 60/447,646, filed on Feb. 14, 2003, provisional application No. 60/447,645, filed on Feb. 14, 2003, provisional application No. 60/447,644, filed on Feb. 14, 2003, provisional application No. 60/447,643, filed on Feb. 14, 2003, provisional application No. 60/447,527, filed on Feb. 14, 2003, provisional application No. 60/446,619, filed on Feb. 12, 2003, provisional application No. 60/446,618, filed on Feb. 12, 2003, provisional application No. 60/446,617, filed on Feb. 12, 2003.

(51) Int. Cl.
*H04Q 7/00* (2006.01)

(52) U.S. Cl. .................. 370/329; 370/431; 370/464

(58) Field of Classification Search ............. 370/329, 370/341, 351, 431, 464; 455/445, 450, 452.1, 455/452.2, 455, 509, 513, 514, 516, 452
See application file for complete search history.

(56) References Cited

U.S. PATENT DOCUMENTS

| | | | |
|---|---|---|---|
| 4,747,101 A | * | 5/1988 | Akaiwa et al. ............. 370/329 |
| 5,280,630 A | | 1/1994 | Wang |
| 2002/0060995 A1 | | 5/2002 | Cervello et al. |

FOREIGN PATENT DOCUMENTS

EP 0 522 276 A2 1/1993

* cited by examiner

*Primary Examiner*—Quochien B. Vuong
(74) *Attorney, Agent, or Firm*—Barnes & Thornburg LLP

(57) ABSTRACT

The invention is directed to methods and apparatus for transmitting data between a first node and a second node in a communications network, for example a wireless network. The method comprises the steps of selecting a transmission channel from a predetermined set of transmission channels according to probability information and transmitting data using the selected channel. The probability information is based on a determination of a characteristic of previous transmissions using each of said set of channels. The invention is also directed to a method of selecting a channel at a node in a communications network for communication with a second node.

35 Claims, 7 Drawing Sheets

CHANNEL SELECTION

RELATED APPLICATION

This application is the full utility filing of U.S. provisional application No. 60/480,599 filed on Jun. 20, 2003, from which the present application claims priority and which is incorporated herein by reference.

CROSS-REFERENCE TO RELATED APPLICATIONS

This patent application is related to the following Provisional patent applications filed in the U.S. Patent and Trademark Office, the disclosures of which are expressly incorporated herein by reference:

U.S. Patent Application Ser. No. 60/446,617 filed on Feb. 12, 2003 and entitled "System for Coordination of Multi Beam Transit Radio Links for a Distributed Wireless Access System" [15741]

U.S. Patent Application Ser. No. 60/446,618 filed on Feb. 12, 2003 and entitled "Rendezvous Coordination of Beamed Transit Radio Links for a Distributed Multi-Hop Wireless Access System" [15743]

U.S. Patent Application Ser. No. 60/446,619 filed on Feb. 12, 2003 and entitled "Distributed Multi-Beam Wireless System Capable of Node Discovery, Rediscovery and Interference Mitigation" [15742]

U.S. Patent Application Ser. No. 60/447,527 filed on Feb. 14, 2003 and entitled "Cylindrical Multibeam Planar Antenna Structure and Method of Fabrication" [15907]

U.S. Patent Application Ser. No. 60/447,643 filed on Feb. 14, 2003 and entitled "An Omni-Directional Antenna" [15908]

U.S. Patent Application Ser. No. 60/447,644 filed on Feb. 14, 2003 and entitled "Antenna Diversity" [15913]

U.S. Patent Application Ser. No. 60/447,645 filed on Feb. 14, 2003 and entitled "Wireless Antennas, Networks, Methods, Software, and Services" [15912]

U.S. Patent Application Ser. No. 60/447,646 filed on Feb. 14, 2003 and entitled "Wireless Communication" [15897]

U.S. Patent Application Ser. No. 60/451,897 filed on Mar. 4, 2003 and entitled "Offsetting Patch Antennas on an Omni-Directional Multi-Facetted Array to allow Space for an Interconnection Board" [15958]

U.S. Patent Application Ser. No. 60/453,011 filed on Mar. 7, 2003 and entitled "Method to Enhance Link Range in a Distributed Multi-hop Wireless Network using Self-Configurable Antenna" [15946]

U.S. Patent Application Ser. No. 60/453,840 filed on Mar. 11, 2003 and entitled "Operation and Control of a High Gain Phased Array Antenna in a Distributed Wireless Network" [15950]

U.S. Patent Application Ser. No. 60/454,715 filed on March 15, 2003 and entitled "Directive Antenna System in a Distributed Wireless Network" [15952]

U.S. Patent Application Ser. No. 60/461,344 filed on Apr. 9, 2003 and entitled "Method of Assessing Indoor-Outdoor Location of Wireless Access Node" [15953]

U.S. Patent Application Ser. No. 60/461,579 filed on Apr. 9, 2003 and entitled "Minimisation of Radio Resource Usage in Multi-Hop Networks with Multiple Routings" [15930]

U.S. Patent Application Ser. No. 60/464,844 filed on Apr. 23, 2003 and entitled "Improving IP QoS though Host-Based Constrained Routing in Mobile Environments" [15807]

U.S. Patent Application Ser. No. 60/467,432 filed on May 2, 2003 and entitled "A Method for Path Discovery and Selection in Ad Hoc Wireless Networks" [15951]

U.S. Patent Application Ser. No. 60/468,456 filed on May 7, 2003 and entitled "A Method for the Self-Selection of Radio Frequency Channels to Reduce Co-Channel and Adjacent Channel Interference in a Wireless Distributed Network" [16101]

FIELD OF THE INVENTION

This invention relates to methods and apparatus for channel selection within a communications network. The invention relates particularly to a wireless network, for example a wireless relay network.

BACKGROUND TO THE INVENTION

A communications network may comprise a number of nodes which are connected by communication paths or links. There may be many possible channels which can be used to communicate between two nodes over a single communication path. These channels may be defined by parameters, which may include, but are not limited to, frequency (i.e carrier frequency), coding scheme, time slot and beam selection.

Before data can be transmitted across a communication path, it is necessary to decide which channel should be used. Each of the channels is unlikely to provide an equal quality link and this is particularly true in the case of wireless links which will be affected by interference from other radio sources in the vicinity and also from communications across other paths in the network.

Several techniques have been proposed to select a channel in order to be able to transmit data. In some situations the quality of each channel is measured prior to making the selection and the best quality channel is selected. This requires a lot of measurement overhead in order to determine the best channel and may require additional signalling.

In GSM and Bluetooth a technique of frequency hopping is used. Both the nodes which are communicating switch between frequencies according to the same predetermined pattern. This uses all possible channels for a short period of time each and ensures that nodes do not dwell on a poor quality channel.

Alternatively, the network can include an overall control entity which manages allocation of channels for communication paths. However, in some circumstances the use of an overall control entity is problematic. Reasons for this include inflexibility to changes in network structure and environmental conditions etc and also large computational and signalling overheads. Additionally, a system using an overall control entity does not scale well.

OBJECT OF THE INVENTION

The invention seeks to provide a method of channel selection which mitigates at least one of the problems of known methods.

SUMMARY OF THE INVENTION

According to a first aspect of the invention there is provided a method of transmitting data between a first node and a second node comprising the steps of: determining probability information based on a determination of characteristics of previous transmissions using each of a predetermined set of transmission channels; selecting a transmission channel from said set of channels according to said probability information; and transmitting data using the selected channel.

This has an advantage that the nodes themselves determine the channel to be used and an overall control element is not required within a communications network.

A further advantage is that channels which have historically been good are used more often than those that have historically been poor, which results in a better chance of a successful transmission. This mitigates against both own network and non network interference.

Another advantage is that the method provides resilience to intentional interference (i.e. jamming) for example 'denial of service' attacks which jam systems by creating deliberate interference to the received signal. The resilience is greatest if the adaptation time constant is rapid.

The method may further comprise the steps of: determining a characteristic of the transmission; and updating said probability information according to said determination.

This has an advantage that the probability information is updated to track changes in network conditions, for example if a new network interferer appears which means that a historically good channel becomes poor. Alternatively, if a non network interferer disappears, it enables a channel which was originally considered poor to be re-evaluated.

The characteristic may be a quality metric.

The quality metric may be one of throughput, number of packet failures, CNIR and success rate.

The probability information may comprise a probability of selection for each of said set of channels.

Each said probability of selection may be greater than zero.

This has an advantage that a channel is never ruled out totally. If a channel was given a probability of selection of zero then there is no way that it will be re-evaluated as it will never be selected in the future. This could result in a situation where over time all but one channel was ruled out and this may not necessarily be the best channel because network conditions may have changed since channels were ruled out.

The set of transmission channels may be a set of wireless transmission channels.

The predetermined set of channels may exclude a specified channel. The specified channel may be reserved for transmitting data to a third node.

This has an advantage that a specified channel (or set of channels) can be reserved for particular uses or links. This reservation results in these particular uses or links using the specified channel(s) (which may be of high importance or high traffic throughput, for example) having minimised interference from the rest of the network.

According to a second aspect of the invention there is provided a method of transmitting data in a wireless distribution system as described above.

According to a third aspect of the invention there is provided a node in a communications network comprising: a transmitter with a predetermined set of channels each of which can transmit information; and a selector capable of interrogating a memory in order to select one of the set of channels for transmission, wherein said memory contains probability information and said probability information is based on determinations of a characteristic of previous communications using each of said set of channels.

The node may further comprise: a transceiver having an input comprising a communication from a remote node and an output comprising a characteristic of said communication; and an analyser having an input connected to said output of said transceiver and an output comprising updated probability information, wherein said memory has an input connected to said output of said analyser.

The characteristic may be a quality metric.

The quality metric may be one of throughput, number of packet failures, CNIR and success rate.

The probability information may comprise a probability of selection for each of said set of channels.

Each said probability of selection may be greater than zero.

The transmitter may be a wireless transmitter and said set of channels may be a set of wireless transmission channels.

According to a fourth aspect of the invention there is provided a communications system comprising a node as described above.

According to a fifth aspect of the invention there is provided a method of selecting a channel at a node in a communications network comprising; storing probability information based on a determination of a characteristic of previous communications with a second node; and selecting a channel for communication with the second node from a predetermined set of channels based on said probability information.

The method may further comprise the steps of: communicating with said second node using said selected channel; determining said characteristic of the communication; and updating said probability information according to said determination.

The predetermined set of channels may exclude a specified channel. The specified channel may be reserved for communication with a third node.

The method may further comprise the steps of: storing second probability information based on a determination of a characteristic of previous communications with a third node; and selecting a channel for communication with the third node from a second predetermined set of channels based on said second probability information.

The first predetermined set of channels and the second predetermined set of channels may be identical.

The method may further comprise the steps of: communicating with said second node using said channel selected for communication with said second node; determining said characteristic of the communication with the second node; updating said probability information according to said determination and a first algorithm; communicating with said third node using said channel selected for communication with said third node; determining said characteristic of the communication with said third node; and updating said second probability information according to said determination and a second algorithm.

The characteristic may be a quality metric.

The quality metric may be one of throughput, number of packet failures, CNIR and success rate.

The probability information may comprise a probability of selection for each of said set of channels.

Each said probability of selection may be greater than zero.

The communications network may be a wireless network.

According to a sixth aspect of the invention there is provided a computer program for performing any of the methods described above. The computer program may be software in machine readable form which may be on a storage medium. The software may be used to control hardware in order to perform the methods.

According to a seventh aspect of the invention there is provided a method of selecting a channel for communication over a link in a communication network, said network comprising a plurality of nodes and a plurality of links interconnecting said nodes, and said method comprising the steps of: dividing said plurality of links into a plurality of groups; and at each node: storing probability information for each link adjoining said node, said probability information based on a determination of a characteristic of previous communications over said link; selecting a channel for communication over a link adjoining said node from a predetermined set of channels based on said probability information; communicating over said link using said selected channel; determining a characteristic of said communication; and updating said probability information for said link according to said determination and one of a plurality of updating algorithms, wherein each said group of links uses a different one of said plurality of updating algorithms.

Advantageously, this allows different regions of a network (or groups of links), to react to network changes in different ways. For example, some areas may react quickly and some areas may react more slowly. The groups of links may, or may not, be geographically co-located.

The preferred features may be combined as appropriate, as would be apparent to a skilled person, and may be combined with any of the aspects of the invention.

BRIEF DESCRIPTION OF THE DRAWINGS

An embodiment of the invention will now be described with reference to the accompanying drawings in which.

DETAILED DESCRIPTION OF INVENTION

Embodiments of the present invention are described below by way of example only. These examples represent the best ways of putting the invention into practice that are currently known to the Applicant although they are not the only ways in which this could be achieved.

Figure 1:
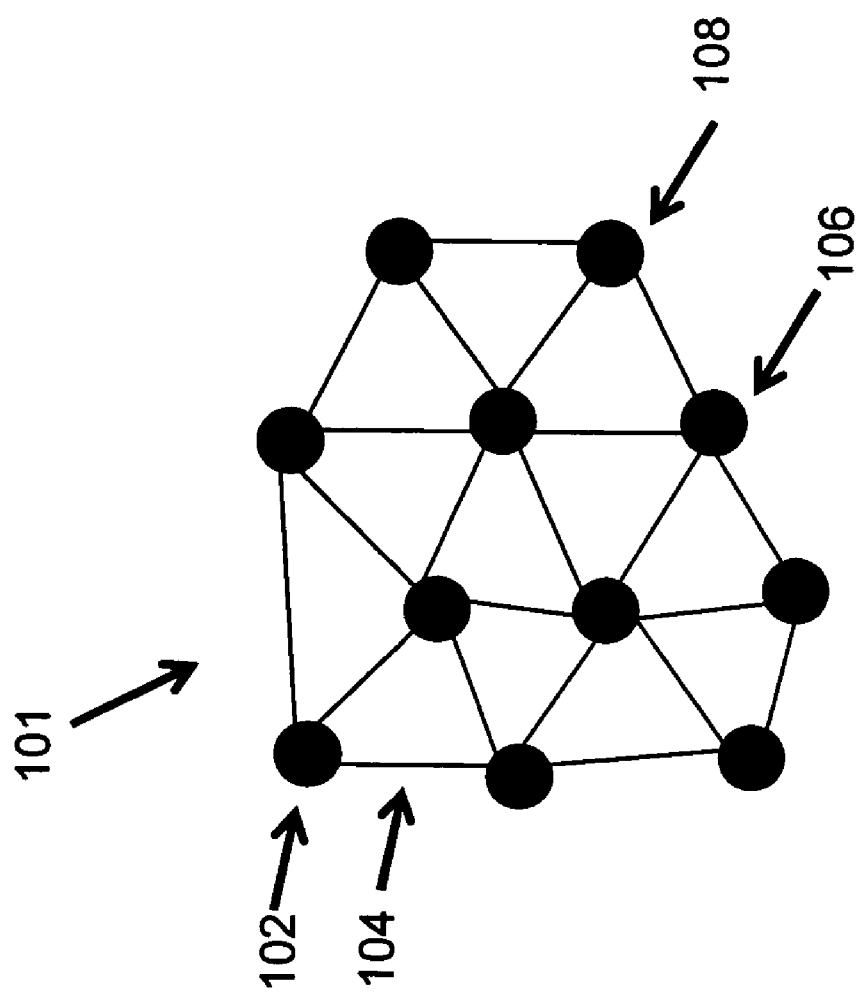
FIG. 1 is a schematic diagram of a wireless communications network which has mesh architecture.

FIG. 1 shows a wireless communications network 101 which has mesh architecture, comprising a number of nodes 102 which can communicate with other nodes over communication paths 104. This network may be, for example, the wireless distribution system for a Community Area Network (CAN), a wireless backhaul for a cellular network, a wireless relay network, or a Wireless Local Area Network (WLAN). The links between nodes over the communication paths may utilise an existing wireless standard such as the IEEE 802.11a PHY/MAC standard, although any other wireless technology could also be used. The mesh architecture shown in FIG. 1 is by way of example only and all other wireless network architectures would also be suitable, including, but not limited to, tree architectures, cellular architectures, relay architectures and linear architectures.

If a node 106 has data, which may be packet data, to transmit to adjacent node 108, they may agree a scheduled transmission, as described in Nortel Networks provisional patent application No. 60/447,646 filed Feb. 14, 2003. Alternatively, the transmission may be agreed on an ad-hoc basis when there is data to send.

Prior to transmission of the data, it is necessary to select the transmission channel which will be used over the transmission path. Within the network there may be a defined set of channels which may be used. For purposes of illustration only, network 101 has a set of 8 identical channels which may be used, which are referred to as channels 0-7. The quality of transmission which can be achieved on each of the 8 channels, is however, unlikely to be identical. This will depend on many factors including, but not limited to, non network interference (e.g. radar, microwave ovens and other legitimate users for an unlicensed network) and interference from other transmissions within the network. Non network interference may result in a particular channel being poor quality consistently for a particular path whereas network interference is more likely to result in a particular channel being poor quality for shorter periods of time for that particular path.

Of the two nodes 106, 108 one will be the master node in the interaction, for example 106, and the other node will be the slave node. The selection of master and slave may be the same for all communications between the pair of nodes or may change in an agreed or predetermined manner. A node may be a master for communication with a first node and a slave for communication with a second node.

Figure 2:
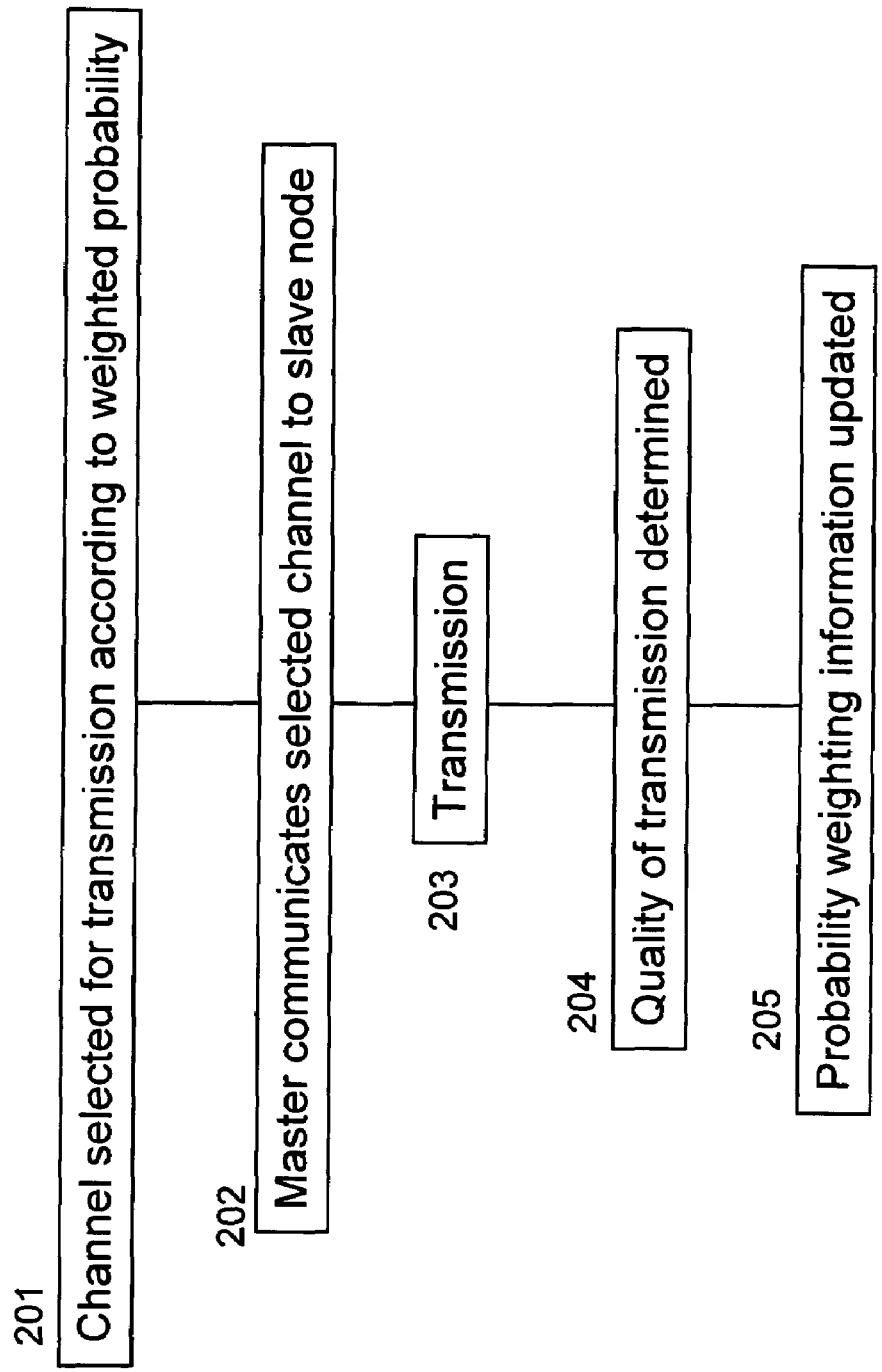
FIG. 2 is a flow chart of a channel selection algorithm according to the present invention.

It is the master node which is responsible for selecting the channel to be used for communication with the slave, although the data may flow from the master to the slave or from the slave to the master or in both directions. An algorithm for channel selection is shown in FIG. 2.

The master node selects a channel for a transmission from the set of available channels 0-7 in a pseudo-random manner according to a probability weighting for communication between that specific pair of nodes (step 201).

The term 'pseudo-random' is a term well-known in the art, which means that the selection is generated computationally rather than being truly random. This invention is equally applicable to the situation where the master node selects the channel in a truly random manner according to a probability weighting as described below.

Although all the examples provided refer to pseudo-random selection, the invention is also applicable to the situation where the selection is deterministic according to the probability weighting, for example, where the master node selects each channel in turn according to the probability weighting (e.g. repeated consecutive visits to the same channel).

The probability weighting information, which may be in the form of a table or database, may be stored at the node (e.g. the master node) or at another network resource which can be accessed by the node. There may be only one probability weighting table or there may be two probability weighting tables, one stored at each node, in particular where the role of master and slave mode is reversed at any point. These two probability weighting tables may be independent of each other or may be synchronised.

Additionally, in some circumstances where network traffic differs considerably for certain periods of time, (e.g. times of the day, days of the week etc), there may be different probability weighting tables for use at certain periods.

The probability weighting information is built up from experience of previous transmissions over the same communication path and indicates the likelihood that there will be a good quality transmission over that channel over that path.

The result of using a channel selection technique weighted according to the probability weighting information is that channels which historically have given better quality transmission will in the future be selected more often than channels which have historically given worse quality transmission.

For the purposes of this discussion it is assumed that a channel with a high probability weighting is selected more often than a channel with a low probability weighting.

Having selected the channel to be used, the master communicates this choice to the slave node (step 202), which enables the subsequent data transmission to pass between the two nodes (step 203). The initial communication (step 202) may utilise a predetermined channel, for example the same channel may be used for communication of the channel choice for each transmission or the channel used in the previous transmission may be used. The data transmission may be from master to slave or in the opposite direction. During or after the data transmission, the quality of the data transmission is determined according to a predetermined metric or set of metrics (step 204). As a result of this quality determination, the probability weighting information is updated (step 205). The manner in which the quality determination may impact the probability weighting for future transmissions is described in more detail later. In some cases, the quality determination may mean that there is no change to the probability weighting.

Figure 3:
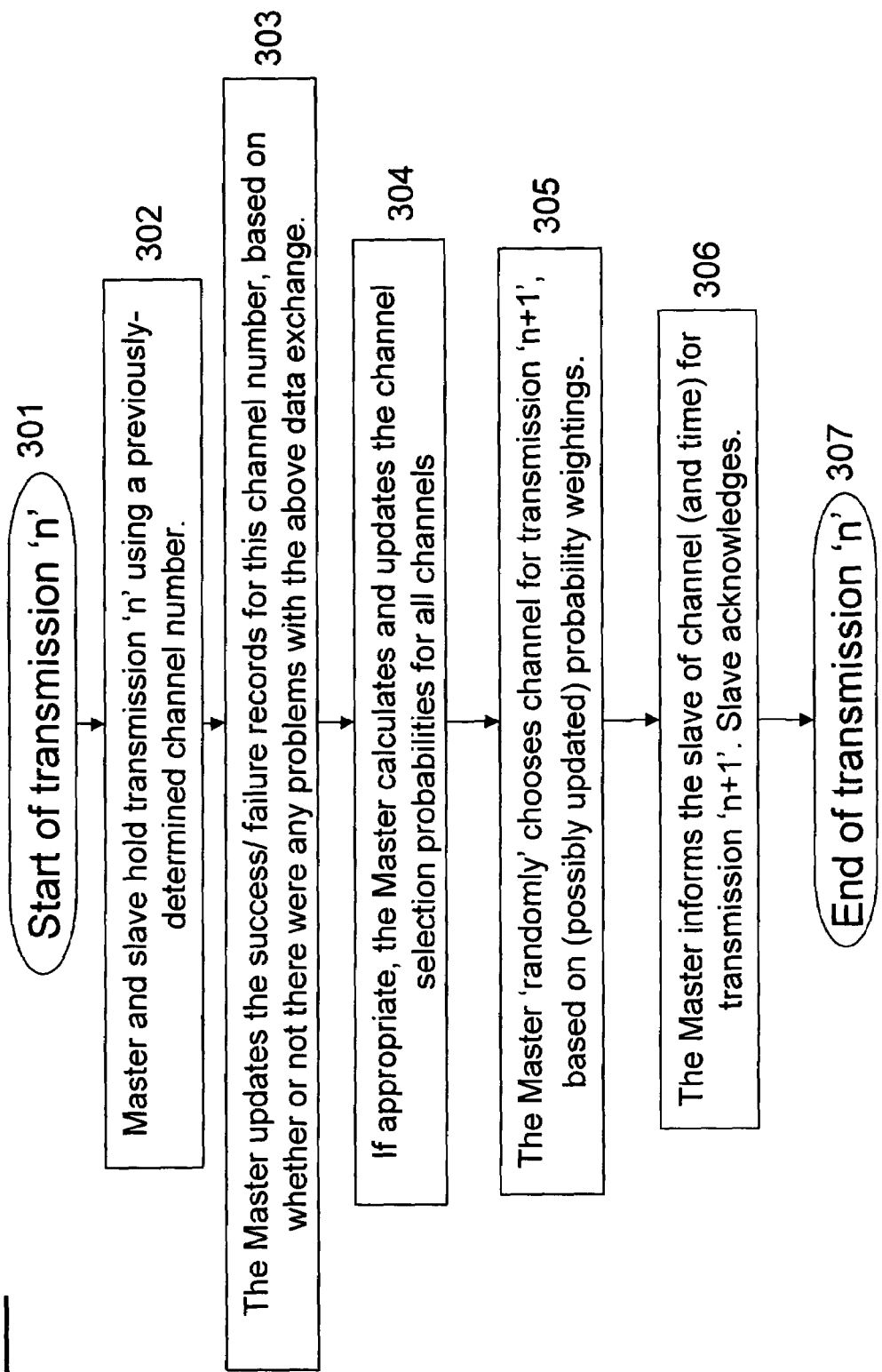
FIG. 3 is a flow chart of a second channel selection algorithm according to the present invention.

Another example of a channel selection algorithm is shown in FIG. 3. According to this example, the channel selection for a transmission is agreed in the previous transmission. This may be beneficial in reducing the amount of signalling required between the two nodes.

The transmission starts (step 301) and data is exchanged using the previously determined and agreed channel (step 302). During or after the transmission, the master node updates success/failure records associated with this channel number according to the quality determination of the transmission (step 303). If required the master calculates and updates the channel selection probabilities recorded in the probability weighting table (step 304). The master then makes a pseudo-random selection of the channel for the next transmission with the same node (step 305) based on the probability weighting table. Before ending the transmission (step 307), the master and slave agree the channel selection for the next transmission (step 306). The master and slave may also agree the time of the next transmission (as part of step 306) and this may involve a negotiation process.

In the algorithm of FIG. 3, the channel selection for a transmission is agreed in the previous transmission. Alternatively, the channel selection for a transmission could be agreed several transmissions previously, for example 10 transmissions earlier. This may provide more resilience to transmission failures.

It may be beneficial to provide an agreed back up channel for communication in the situation that the master and the slave node fail to agree on a channel (or channels) for a subsequent transmission. This failure to agree may be caused by the data which indicated the next channel to use being lost in transmission. Dummy data transmissions could be scheduled periodically to allow the master and slave nodes to synchronise probability weighting tables if this is being implemented. These transmissions could also be used to agree the next channel to use following a problem in agreeing the channel to use, as discussed above.

Suitable quality metrics for monitoring the quality of a transmission include, but are not limited to:

Success/failure of transmission

Throughput

In some wireless technologies, include IEEE 802.11a, there are a number of possible data rates which could be used for the transmission. Quality may therefore be determined by the data rate which was achieved over the communication channel.

This may be the peak rate, the minimum rate or the average rate. The average rate may be calculated over a large number of transmissions (for example 100-1,000 transmissions).

Number of packet failures

In some networks, receipt of each data packet is acknowledged. Failure to receive an acknowledgement may cause the packet to be retransmitted. It is therefore possible to count either all packets that failed initially or all packets which failed to be received even after the allowed number of retransmissions (e.g. 4 retransmission may be permitted within the network).

In some technologies, negative acknowledgements are sent by the receiving node where they know that a packet was sent but not received, or not received in a readable state. It is therefore possible to count these negative acknowledgements.

This metric has several advantages, including the fact that this metric is often already monitored and it would therefore be simple to implement.

CNIR (Carrier to Noise and Interference Ratio)

This may be the minimum, peak or average CNIR.

Interference level

For example, the ratio of CNIR to CNR (Carrier to Noise Ratio).

There are a number of ways in which the probability weighting information can be changed as a result of the quality determination, including, but not limited to:

Comparing with a 'good quality threshold' such that communications that exceed this quality threshold are deemed good quality and the probability weighting of these channels are increased. If a channel does not exceed the quality threshold there would be no change to the probability weighting.

Comparing with a 'poor quality threshold' such that communications that do not exceed this quality threshold are deemed poor quality and the probability weighting of these channels are decreased. If a channel exceeds the quality threshold there would be no change to the probability weighting.

Comparing with a single threshold and communications that exceed the threshold have the probability weighting of these channels increased and those that do not exceed the threshold have their probability weighting decreased.

Comparing with multiple thresholds, such that according to the quality determination, the probability weighting of the channel may be increased or decreased by a particular additive amount or multiplicative factor, where this amount or factor may not necessarily be the same for each threshold. The amount may have any value including zero and the factor may have any value including one, but not zero.

Utilisation of positive feedback, for example as described above with a 'good quality threshold', may result in a single channel dominating the probability weighting. This may be the highest throughput solution. However, this may alternatively result in convergence on a bad solution (i.e. a poor channel) which it is very hard to change.

Utilisation of negative feedback, for example as described above with a 'poor quality threshold', is more likely to result in a number of channels each having a high probability weighting. Although this may not be the highest throughput solution, this may be more robust to appearance of new non network interferers which result in a good channel becoming very poor, as there are other alternative good channels that can be used.

In addition to the above methods, it may be advantageous to include additional controls, for example to ensure that the probability of a channel never drops to zero (or too close to zero). One way to implement this would be through a remapping process as described later and could involve the setting of a minimum probability threshold (e.g. 0.025). By ensuring that the probability of a channel never drops to zero, it guarantees that each channel is visited at some point, even if it is not very frequently, so that if a channel which has historically been very poor improves, then its probability weighting can be increased. Such a situation may occur when a non network interferer disappears.

It may also be beneficial in some circumstances to introduce additional controls to ensure that a single channel does not obtain a very high probability (close to 1) which results in this channel being chosen most of the time. This may be implemented by the multiple threshold and variable change in probability weighting method as described above or through a remapping process as described later. The reason that such controls may be advantageous in some circumstances is for reasons of robustness.

If a single channel has very high probability and all the others have very low probability, if new interference appears which affects the single channel, such as a new non network interferer, the master node does not necessarily have a second choice channel clearly identified. It may be a more robust solution, therefore, to implement an algorithm which results in each path having a selection of at least a few channels with high probability weighting. In a situation where there are a few channels which are all approximately as good as each other, it may be beneficial to select each channel with an equal probability, rather than to favour the one channel which is marginally better than the rest.

Figure 4:
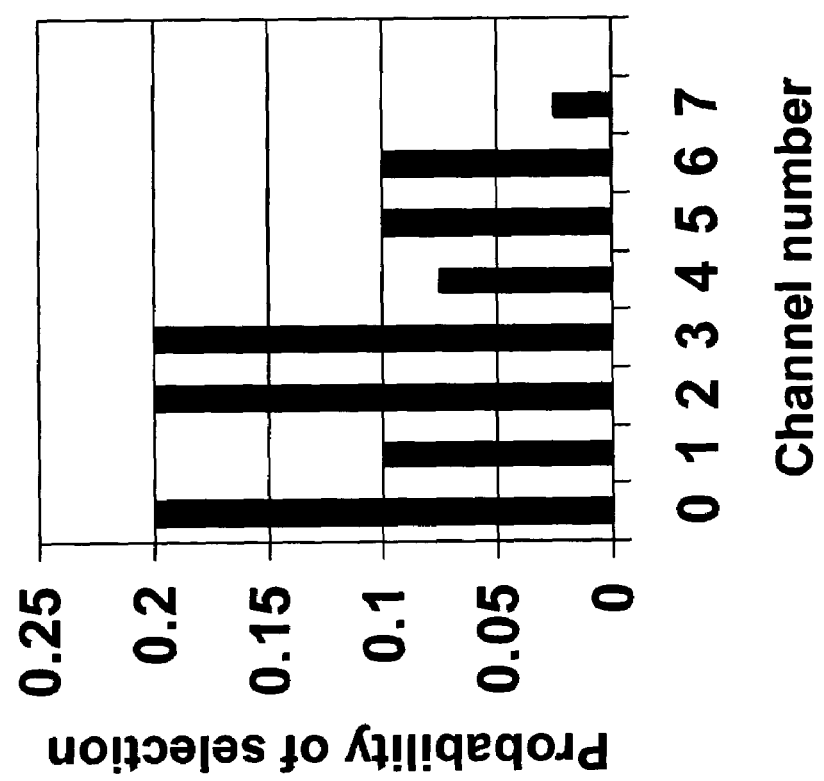
FIG. 4 shows an example graph of probability weighting according to the present invention.

An example of such a probability weighting distribution is shown in the graph of FIG. 4. Channels 0, 2, and 3 are historically good channels and are therefore selected more frequently. Channel 7 is a historically bad channel and is therefore selected rarely (probability weighting of 0.025, and is therefore selected on average only once in 40 transmissions).

Figure 5:
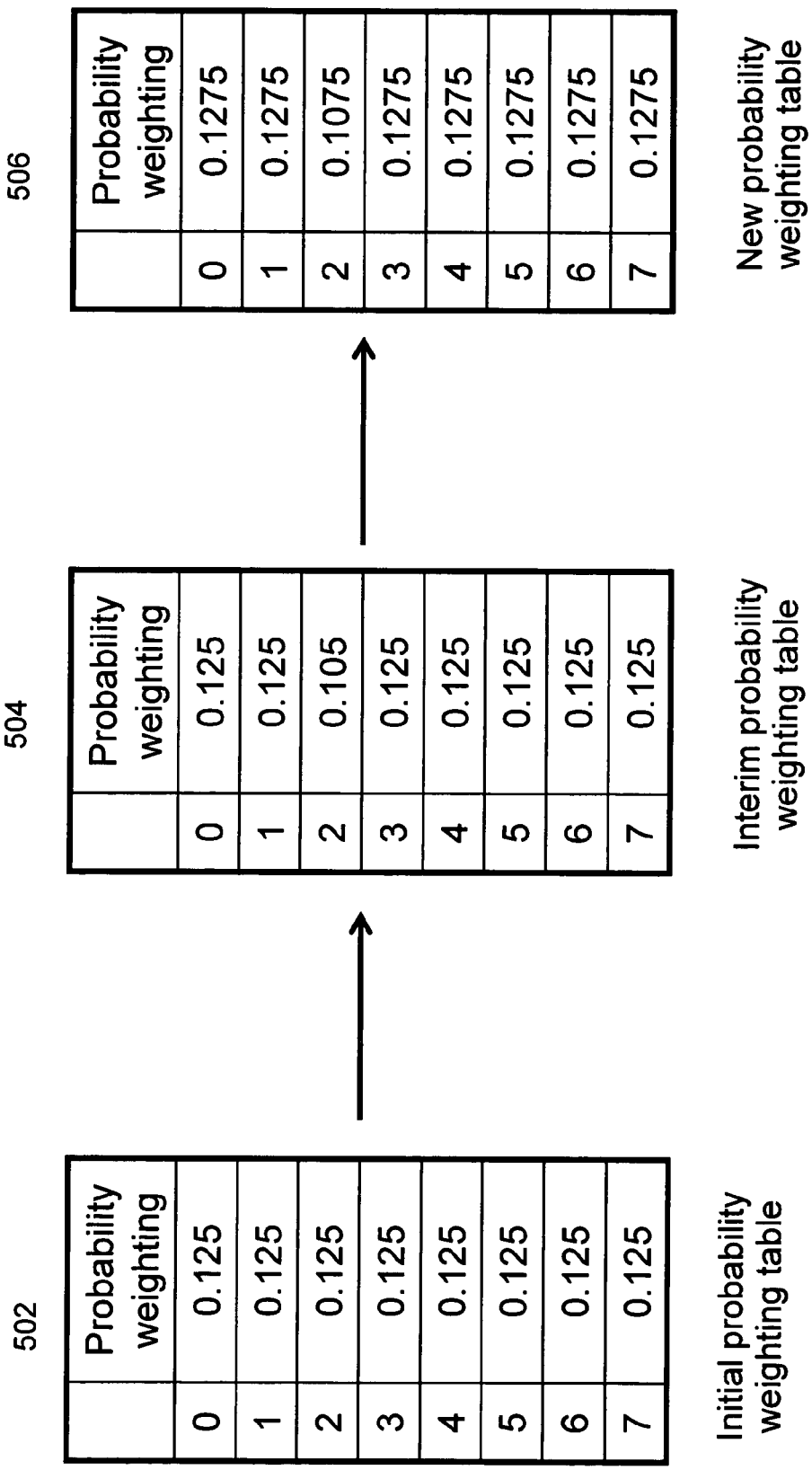
FIG. 5 shows a flow chart of an algorithm to change the probability weighting according to the present invention.

An example algorithm for changing the probability weighting as a result of the quality determination is shown in FIG. 5. Depending on the quality determination, it may not always be necessary to change the probability weighting, as described above.

The initial probability weighting table 502 shows all 8 channels having equal probability which will result in each channel being selected on average once in every eight transmissions. This may, for example, be the situation for the first ever transmission between a particular pair of nodes within a network.

If, for example, as a result of a communication using channel 2, the quality of this channel is shown to be poor as it does not exceed the 'poor quality threshold' which has been set within the network, (e.g. a throughput of only 6 Mbit/s was achieved over the link and the 'poor quality threshold' was set at 20 Mbit/s), the probability weighting of channel 2 may be decreased by a predetermined amount (e.g. 0.02) as shown in the interim probability weighting table 504. It can be seen from this table 504 that the probability weightings are no longer true probabilities as they no longer add up to unity (one) but instead add up to 0.98. It is therefore necessary to normalise these values to produce the new probability weightings as shown in the new probability weighting table 506, (the values shown have been approximated to only 4 decimal places for purposes of illustration only). Note that the effect is that the channels other than channel 2 have had their probability increased as a result of the failure of channel 2 to exceed the 'poor quality threshold'.

The algorithm described above and shown in FIG. 5 shows the probability weightings being changed in an additive manner as a result of the quality determination. Alternatively the probability weightings could be multiplied by a (non-zero) factor. This would make larger changes to high probabilities than to small probabilities.

Figure 6:
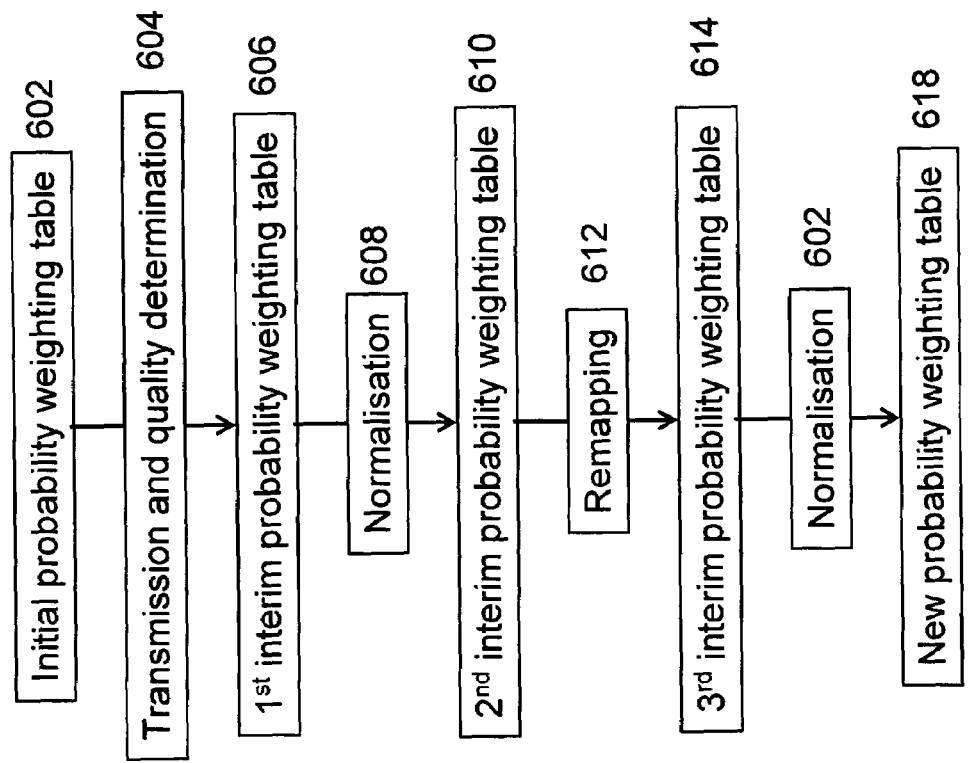
FIG. 6 shows a flow chart of a second algorithm to change the probability weighting according to the present invention.

If, in different circumstances, one channel has a probability weighting approaching unity or one or more channels have a probability of zero, it may be beneficial to include a remapping stage in the algorithm, as shown in the flow chart of FIG. 6. The initial probability weighting table 602 is amended as a result of a transmission and quality determination (step 604) to produce the $1^{st}$ interim probability weighting table 606. This may then be normalised (step 608) to produce the $2^{nd}$ interim probability weighting table 610 prior to remapping (step 612). Depending on the remapping technique it may not be necessary to normalise prior to remapping, therefore removing the need for the $2^{nd}$ interim probability weighting table 610 and the normalisation stage 608. Remapping results in the $3^{rd}$ interim probability weighting table 614. This table 614 is then normalised (step 616) to produce the new probability weighting table 618.

Selection of the predetermined amount by which the probability weighting is changed affects the speed at which the probability weighting information reacts to network conditions. Selection of a large amount results in the probability weighting information reacting quickly to changes in network conditions but means that it is influenced by random transient network fluctuations. Selection of a small amount results in probability weighting information which evens out random fluctuations but is slower to respond to changes in network conditions, such as the appearance of a new non network interferer.

Figure 7:
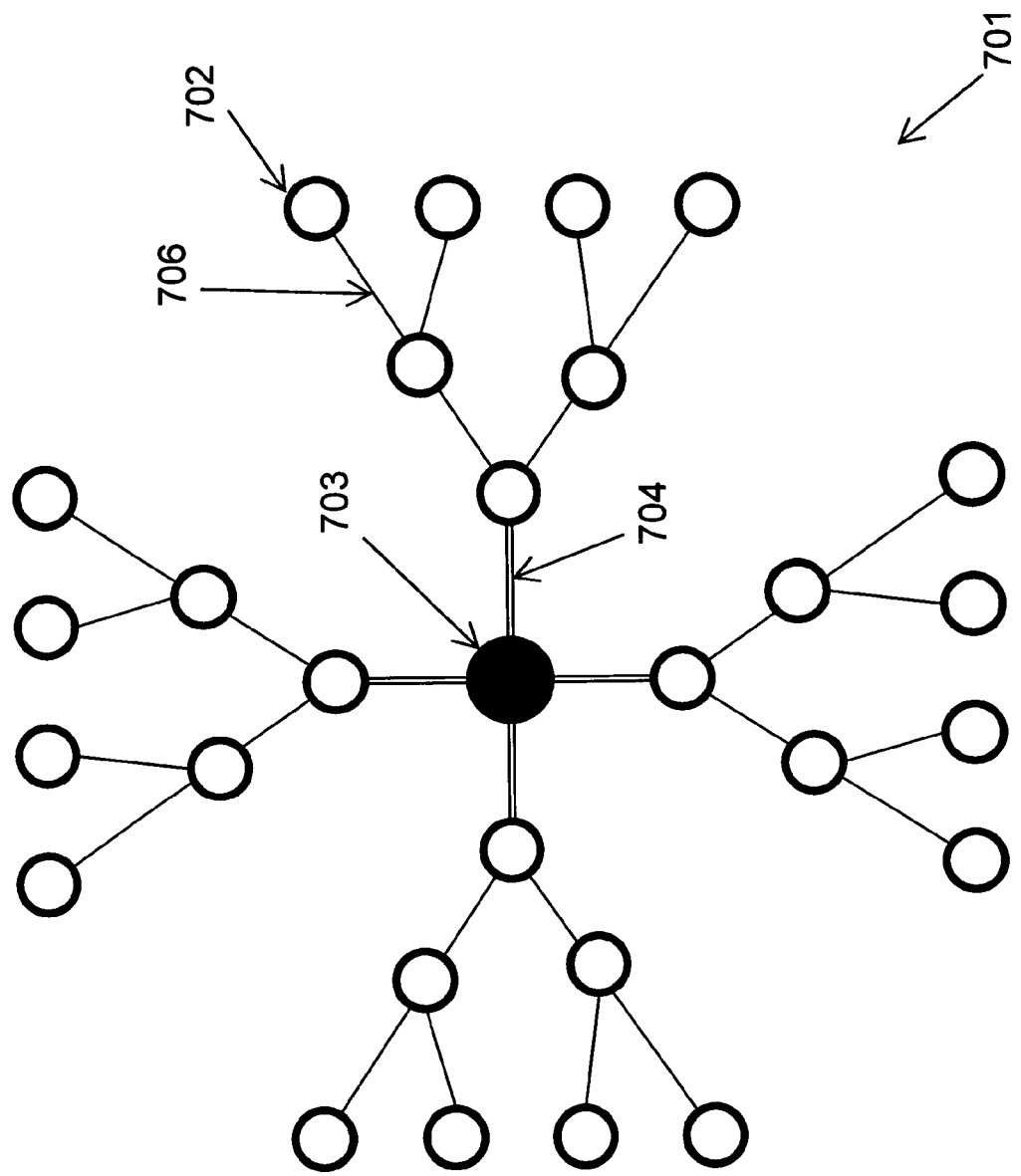
FIG. 7 is a schematic diagram of a wireless communications network.

Further aspects of the invention are described with reference to FIG. 7, which shows a schematic diagram of a wireless communications network 701.

The network 701 consists of nodes 702 connected by communication paths 704, 706. The network shown includes one special node 703, herein referred to as a Network Access Point (NAP) which has the same functionality as a node 702 but is additionally connected to a backbone network (not shown). The backbone network may be a high capacity network which allows transfer of data between the network 701 and other networks. The backbone network may be a wireless network but may alternatively use another technology such as optical or electrical (wireline) technologies. Nodes 702 are not connected to the backbone network directly, but can communicate with it via the NAP 703. The nodes 702 communicate with each other over node-node communication paths 706, (paths between two nodes) and those nodes located close to the NAP, communicate with the NAP over node-NAP communication paths 704, (paths between a node and a NAP). The nodes 702 are shown connected in a tree structure, however they may alternatively be arranged in a mesh structure (similar to that shown in FIG. 1).

In one embodiment, the node-NAP communication uses a predetermined frequency, f1 (or channel c1) for all node-NAP communication over paths 704. The node-node communication over paths 706 uses the selection method described above with reference to FIGS. 1-6. The predetermined set of frequencies (or channels) used by the nodes to communicate with other nodes may include f1, however in some circumstances it may be beneficial that the predetermined set excludes f1.

If f1 is excluded from the set of frequencies used for node-node communication, this may have the benefit of minimising the network interference on the node-NAP paths. This will be particularly beneficial in a network scenario where most of the traffic flows between the nodes and the backbone network, as this results in the node-NAP paths having the highest traffic load within network 701.

Alternatively, the node-NAP communication may use a predetermined set of frequencies, f1-fx (channels c1-cx). The node-node communication may use an identical or a different predetermined set of frequencies. The set of frequencies used for node-NAP communication may be a subset of the frequencies used for node-node communication. This may be particularly beneficial where the NAP contains the functionality of more than one node.

In another embodiment, the node-NAP communication uses a first predetermined set of frequencies and a first selection algorithm according to the methods described above in relation to FIGS. 1-6. The node-node communication uses a second predetermined set of frequencies and a second selection algorithm according to the methods described above in relation to FIGS. 1-6. The first and second predetermined sets of frequencies may be the same or different.

The first and second selection algorithms may have different amounts by which the probability weighting is changed. This may be beneficial as the node-NAP paths may carry the most traffic (as described above) and therefore have different requirements to the lower traffic carrying node-node paths.

These ideas may be extended to a tiered or segmented network, where the different tiers or segments use different channel selection algorithms or different channel selection techniques. A network may be tiered or segmented by dividing paths (or links) into different groups. The grouping may be geographic (all links in the same geographical area), by level in the network (e.g. node-node or node-NAP as described above) or by any other means.

Although the description above relates to wireless networks and in particular to a wireless distribution system in a Community Area Network, the invention is equally applicable to other communication technologies, including, but not limited to wireless (including microwave and satellite), optical and electrical technologies.

It will be understood that the above description of a preferred embodiment is given by way of example only and that various modifications may be made by those skilled in the art without departing from the spirit and scope of the invention.

The invention claimed is:

1. A method of transmitting data between a first node and a second node comprising the steps of:
    determining probability information based on a determination of characteristics of previous transmissions using each of a predetermined set of transmission channels;
    selecting, during a transmission between the first node and the second node, a transmission channel from said set of channels according to said probability information, the selected channel being for use during a later transmission between the first node and the second node;
    agreeing use of the selected channel during said transmission between the first node and the second node; and
    transmitting data, during said later transmission with the second node, using the selected channel.

2. A method of transmitting data according to claim 1, further comprising the steps of:
    determining a characteristic of the transmission; and
    updating said probability information according to said determination.

3. A method of transmitting data according to claim 1, wherein said characteristic is a quality metric.

4. A method of transmitting data according to claim 3, wherein said quality metric is one of throughput, number of packet failures, CNIR and success rate.

5. A method of transmitting data according to claim 1, wherein said probability information comprises a probability of selection for each of said set of channels.

6. A method of transmitting data according to claim 5, wherein each said probability of selection is greater than zero.

7. A method of transmitting data according to claim 1, wherein said set of transmission channels are a set of wireless transmission channels.

8. A method of transmitting data according to claim 1, wherein said predetermined set of channels excludes a specified channel.

9. A method of transmitting data according to claim 8, wherein said specified channel is reserved for transmitting data to a third node.

10. A method of transmitting data in a wireless distribution system according to claim 1.

11. A machine-readable medium encoded with a computer program for performing the method according to claim 1.

12. A method according to claim 1, further comprising agreeing a time of the later transmission with the second node.

13. A node in a communications network comprising:
    a transmitter with a predetermined set of channels each of which can transmit information; and
    a selector capable of interrogating a memory in order to select one of the set of channels for transmission,
    wherein said memory contains probability information and said probability information is based on determinations of a characteristic of previous communications using each of said set of channels and
    wherein the selector is arranged to select one of the set of channels during a transmission between the node and a second node of the communications network and the transmitter is arranged to agree use of the selected channel with the second node during the transmission, the selected channel being for use during a later transmission between the node and the second node.

14. A node according to claim 13, further comprising:
a transceiver having an input comprising a communication from a remote node and an output comprising a characteristic of said communication; and
an analyser having an input connected to said output of said transceiver and an output comprising updated probability information,
wherein said memory has an input connected to said output of said analyser.

15. A node according to claim 13, wherein said characteristic is a quality metric.

16. A node according to claim 15, wherein said quality metric is one of throughput, number of packet failures, CNIR and success rate.

17. A node according to claim 13, wherein said probability information comprises a probability of selection for each of said set of channels.

18. A node according to claim 13, wherein each said probability of selection is greater than zero.

19. A node according to claim 13, wherein said transmitter is a wireless transmitter and said set of channels are a set of wireless transmission channels.

20. A communications system comprising a node according to claim 13.

21. A node according to claim 13, wherein the transmitter is further arranged to agree a time of the later transmission with the second node.

22. A method of selecting a channel at a node in a communications network comprising;
storing probability information based on a determination of a characteristic of previous communications with a second node;
selecting, during a transmission between the node and the second node, a channel for communication with the second node from a predetermined set of channels based on said probability information, the selected channel being for use during a later transmission between the node and the second node; and
agreeing use of the selected channel during said transmission between the first node and the second node.

23. A method of selecting a channel according to claim 22, further comprising the steps of:
communicating with said second node using said selected channel;
determining said characteristic of the communication; and
updating said probability information according to said determination.

24. A method of selecting a channel according to claim 22, wherein said predetermined set of channels excludes a specified channel.

25. A method of selecting a channel according to claim 22, wherein said specified channel is reserved for communication with a third node.

26. A method of selecting a channel according to claim 22, further comprising the steps of:
storing second probability information based on a determination of a characteristic of previous communications with a third node; and
selecting a channel for communication with the third node from a second predetermined set of channels based on said second probability information.

27. A method of selecting a channel according to claim 26, wherein said predetermined set of channels and said second predetermined set of channels are identical.

28. A method of selecting a channel according to claim 26, further comprising the steps of:
communicating with said second node using said channel selected for communication with said second node;
determining said characteristic of the communication with the second node;
updating said probability information according to said determination and a first algorithm;
communicating with said third node using said channel selected for communication with said third node;
determining said characteristic of the communication with said third node; and
updating said second probability information according to said determination and a second algorithm.

29. A method of selecting a channel according to claim 22, wherein said characteristic is a quality metric.

30. A method of selecting a channel according to claim 22, wherein said quality metric is one of throughput, number of packet failures, CNIR and success rate.

31. A method of selecting a channel according to claim 22, wherein said probability information comprises a probability of selection for each of said set of channels.

32. A method of selecting a channel according to claim 22, wherein each said probability of selection is greater than zero.

33. A method of selecting a channel according to claim 22, wherein said communications network is a wireless network.

34. A machine-readable medium encoded with a computer program for performing the method according to claim 22.

35. A method of selecting a channel for communication over a link in a communication network, said network comprising a plurality of nodes and a plurality of links interconnecting said nodes, and said method comprising the steps of:
dividing said plurality of links into a plurality of groups; and
at each node:
storing probability information for each link adjoining said node, said probability information based on a determination of a characteristic of previous communications over said link;
selecting a channel for communication over a link adjoining said node from a predetermined set of channels based on said probability information;
communicating over said link using said selected channel;
determining a characteristic of said communication; and
updating said probability information for said link according to said determination and one of a plurality of updating algorithms,
wherein each said group of links uses a different one of said plurality of updating algorithms.

* * * * *